US012741334B2

(12) United States Patent
Gauch et al.

(10) Patent No.: US 12,741,334 B2
(45) Date of Patent: Sep. 22, 2026

(54) METHOD FOR FASTENING A ROLLER HEAD TO A WELDING ARM FOR A RESISTANCE SEAM WELDING MACHINE

(71) Applicant: Soudronic AG, Bergdietikon (CH)

(72) Inventors: Pascal Gauch, Rudolfstetten (CH); Matthias Roth, Oberglatt (CH); Daniel Stäubli, Wettingen (CH)

(73) Assignee: SOUDRONIC AG, Bergdietikon (CH)

( * ) Notice: Subject to any disclaimer, the term of this patent is extended or adjusted under 35 U.S.C. 154(b) by 524 days.

(21) Appl. No.: 18/553,429

(22) PCT Filed: Apr. 1, 2021

(86) PCT No.: PCT/EP2021/058745

§ 371 (c)(1),
(2) Date: Sep. 29, 2023

(87) PCT Pub. No.: WO2022/207120

PCT Pub. Date: Oct. 6, 2022

(65) Prior Publication Data

US 2024/0181554 A1 Jun. 6, 2024

(51) Int. Cl.
*B23K 11/06* (2006.01)
*B23K 11/30* (2006.01)

(52) U.S. Cl.
CPC .......... *B23K 11/06* (2013.01); *B23K 11/3045* (2013.01)

(58) Field of Classification Search
CPC .. B23K 11/06; B23K 11/3045; B23K 11/3063
See application file for complete search history.

(56) References Cited

U.S. PATENT DOCUMENTS 4,150,277 A 4/1979 Schalch et al.
5,159,168 A 10/1992 Portmann et al.
(Continued)

FOREIGN PATENT DOCUMENTS

CH 688 680 A5 1/1998
DE 27 47 222 A1 5/1978
(Continued)

OTHER PUBLICATIONS

International Search Report mailed on Dec. 23, 2021, in connection with corresponding International Application No. PCT/EP2021/058745 (5 pp., including machine-generated English translation).

*Primary Examiner* — Robert G Bachner
(74) *Attorney, Agent, or Firm* — McCormick, Paulding & Huber PLLC

(57) ABSTRACT

An arrangement including a welding arm (2) for a resistance seam welding machine and a roller head (1) fastened thereon, which has a stator (3) and an electrode roller (4) which is supported as a rotor on the stator (3) in a rotatable way, wherein the stator (3) protrudes over the electrode roller (4) with fastening extensions (5) on both sides of the electrode roller (4). The welding arm (2) has a reception opening (6) for the roller head (1), which is formed between two limiting walls (7) facing each other, which themselves have fastening reception openings (8) for the fastening extensions (5). The roller head (1) is arranged inside the reception opening (6) in such a way that the electrode roller (4) protrudes outside the reception opening (6) with a part of its circumferential boundary and the fastening extensions (5) are arranged inside the fastening reception openings (8). The roller head (1) is fastened to the welding arm (2) by pressing each of the fastening extensions (5) of the stator (3) with an even contact surface (9) formed thereon to a attributed even contact surface (10, 19) inside the boundaries of the respective fastening reception opening (8), wherein each of the
(Continued)

fastening extensions (5) of the stator (3) is pressed with a clamping piece (11) received in the respective fastening reception opening (8) with its contact surfaces (9) against the attributed contact surfaces (10, 19). It has been discovered that mounting errors may be avoided by the arrangement according to the invention and that a good and reliable sealing and current transmission can be reached.

30 Claims, 10 Drawing Sheets

(56) References Cited

U.S. PATENT DOCUMENTS

| | | | |
|---|---|---|---|
| 5,676,858 | A | 10/1997 | Gantenbein |
| 9,969,027 | B2 | 5/2018 | Dieterich |

FOREIGN PATENT DOCUMENTS

| | | | |
|---|---|---|---|
| DE | 34 32 499 | A1 | 4/1985 |
| DE | 40 20 182 | C1 | 8/1991 |
| EP | 0 714 723 | A1 | 6/1996 |
| WO | 2013/181765 | A1 | 12/2013 |

1
2
3,5
4
6
7
8
10
11
17
18
20
21
A
A
R 22
8
17
6
11
20
3,5
4
1
23
15
2
23
16
24
24

L
14
18
7
6
4
1
17
8
11
3,5
R
10
9
2

14
10
6
8
11
17
3,5
4
1
9
2

14
2
17
8
6
11
12
12
4
13
13
3,5
16
1
24
9,10
15

1
2
3,5
4
6
7
8
9
10
11
17
18
19
20
21
C
C
L
R 1
4
10
6
8
19
8
17
11
3,5
20
9
2
21

8
6
17
20
11
3,5
16
9,19
4
1
24
10,21
15
2

METHOD FOR FASTENING A ROLLER HEAD TO A WELDING ARM FOR A RESISTANCE SEAM WELDING MACHINE

CROSS-REFERENCE TO RELATED APPLICATION

This application is a National Stage application of International Patent Application No. PCT/EP2021/058745, filed Apr. 1, 2021, the disclosure of which is incorporated herein by reference in its entirety.

TECHNICAL FIELD

The invention relates to a method for fastening a roller head to a welding arm for a resistance seam welding machine, an arrangement comprising a welding arm for a resistance seam welding machine and a roller head attached thereto, a resistance seam welding machine with such an arrangement, a roller head for such an arrangement as well as the use of the arrangement for resistance seam welding of the longitudinal seam of container bodies according to the preamble of the independent claims.

BACKGROUND OF THE INVENTION

The documents DE 40 20 182 C1 and WO 2013/181765 A1 describe liquid-cooled roller heads for welding arms for resistance seam welding machines.

Such roller heads comprise a stator and an electrode roller, which is mounted as a rotor on the stator so that it can rotate about an axis of rotation. The stator projects over the electrode roller on both sides of the electrode roller in the direction of the axis of rotation by means of fastening extensions. The electrode rollers of the roller heads wear around their circumference in normal use, and are reworked a few times to extend their service life until the wear limit is reached. This is done in the dismantled state. Accordingly, the roller heads must be replaced relatively frequently. The fastening extensions, which are designed as circular cylindrical axle stubs, serve to fasten the roller head to the welding arm, to transmit the welding current from the welding arm to the roller head, and to supply and discharge cooling liquid for cooling the roller head. For the latter purpose, the fastening extensions have radial supply and discharge holes that must be aligned with assigned supply and discharge holes in the welding arm during assembly. Apart from the fact that assembly errors can occur during alignment of the supply and discharge holes, the roller heads known today also repeatedly experience problems with leaks in the area of the supply and discharge holes as well as contact problems, which can lead to expensive machine downtimes for troubleshooting.

SUMMARY

Therefore, it is the objective of the invention to provide a technical solution by means of which the disadvantages of the prior art can be avoided entirely or at least partially in a cost-effective way.

This objective is reached by the subject matters of the independent claims.

According to these, a first aspect of the invention relates to a method for fastening a roller head to a welding arm for a resistance seam welding machine. The roller head comprises a stator and an electrode roller which is supported as a rotor on the stator in a rotatable way about a rotation axis. The stator protrudes over the electrode roller with fastening extensions on both sides of the electrode roller in the direction of the rotation axis.

The method comprises the steps:

a) providing a welding arm for a resistance seam welding machine having in operation as intended a reception opening for the roller head, which is formed between two, preferably parallel, limiting walls facing each other, which themselves have fastening reception openings for the fastening extensions of the stator of the roller head;

b) arranging the roller head in the reception opening for the roller head in such a way that the electrode roller protrudes outside the reception opening with a part of its circumferential boundary and the fastening extensions are arranged inside the fastening reception openings;

c) fastening the roller head to the welding arm by pressing each of the fastening extensions of the stator with an even contact surface formed thereon to a attributed even contact surface inside the boundaries of the respective fastening reception opening, wherein each of the fastening extensions of the stator is pressed with a clamping piece received in the respective fastening reception opening with its contact surfaces against the attributed contact surfaces.

It has been discovered that mounting errors may be avoided by the arrangement according to the invention and that a good and reliable sealing and current transmission can be reached.

In a first embodiment alternative the attributed contact surface is provided by an adapter arrangement arranged inside the respective fastening reception opening, which itself is pressed with a contact surface formed thereon on an attributed contact surface formed by the boundaries of the respective fastening reception opening. Such solutions are considered as upgrade solutions for existing welding arms according to the prior art.

In a second preferred embodiment alternative each attributed contact surface is provided by the boundaries of the respective fastening reception opening, and not like in the first embodiment alternative by an additional component arranged between these boundaries and the contact surface of the respective fastening extensions. In this way, a direct current transmission from the welding arm to the fastening extensions of the roller head is possible and the fastening reception openings can be designed smaller, thereby enabling a more stable design of the welding arm. It is also possible to fasten the roller head to the welding arm with very little and easy to manufacture parts, which promotes cost effective solutions and requires little know-how and time for replacing the roller heads.

Preferably, the contact surfaces at the fastening extensions of the stator and the attributed contact surfaces extend in planes, which are parallel to the rotation axis of the electrode roller, advantageously perpendicular to a longitudinal axis of the welding arm. In this way, large position-tolerant contact surfaces can be formed between the fastening extensions of the stator and the boundaries of the fastening reception openings on the welding arm, and the stator of the roller head has in mounted state a precisely defined rotational position with respect to the contact surfaces of the boundaries of the fastening reception openings.

Advantageously, the clamping pieces are guided through the boundaries of the fastening reception openings for an ability to shift in clamping direction. This is preferably carried out in such a way that, for guidance, the clamping pieces adjoin, for an ability to shift in clamping direction, attributed guiding surfaces of the boundaries of the fastening reception openings by means of even guiding surfaces extending in pressing direction.

In this way, it is possible to reliably press the fastening extensions of the stator in a controlled manner on the contact surfaces of the boundaries of the fastening reception openings.

It is preferred that the fastening extensions of the stator and the fastening reception openings are adapted in such a way that the fastening extensions can be pressed with their contact surfaces in different positions on the contact surfaces of the boundaries of the fastening reception openings, preferably in different positions transversally to the rotation axis of the electrode roller and perpendicularly to the longitudinal axis of the welding arm. In this way it is possible to shift the rotation axis of the electrode roller transversally to the longitudinal axis of the welding arm and to reach even in case of different electrode roller diameters and fixed welding arm that the electrode roller always protrudes with its circumferential boundary by a certain amount out of the reception opening and thus can be aligned on the so-called "Z-rail" or the welding plane, respectively.

Advantageously, the positions of the fastening extensions are set by means of the clamping pieces in such a way that during pressing of the fastening extensions the latter establish a positive fit with the boundaries of the respective fastening reception opening in a direction parallel to the plane of the contact surfaces and perpendicular to the rotation axis of the electrode roller as well as a positive fit with the respective fastening extension in this direction. In this way, the positions for certain electrode roller diameters with attributed clamping pieces can be set without complex adjustment effort in a positive fitting way and thus securely.

Advantageously, the clamping pieces are pressed against the fastening extensions of the stator by means of clamping screws fastened in the welding arm for pressing the fastening extensions with the contact surfaces formed thereon on the attributed contact surfaces. In this way, all forces used for pressing remain inside the welding arm and large pressing forces can be provided in simple and precise way.

In a further preferred embodiment of the method, the contact surfaces of the fastening extensions of the stator and the attributed contact surfaces of the boundaries of the fastening reception openings have supply and discharge openings for a cooling medium. The fastening extensions of the stator can be arranged and fastened in the fastening reception openings for the fastening extensions in such a way that each of the supply and discharge openings overlap at least partially in each intended position.

In yet a further preferred embodiment of the method according to the invention, one of the limiting walls facing each other of the reception opening for the roller head, which limiting walls form the fastening reception openings for the fastening extensions of the stator of the roller head, is formed by a component which can be temporarily removed from a main body of the welding arm, which main body forms the other one of the two limiting walls of the reception opening for the roller head, preferably showing away in the direction of the rotation axis of the electrode roller. This component is removed temporarily for arranging the roller head in the reception opening such that the reception opening is temporarily open to one side, and is reinstalled after inserting the roller head into the main body in such a way that one of the fastening extensions of the stator of the roller head is arranged inside the fastening reception opening which is formed by the side wall of the main body, in such a way that the other fastening extension of the stator is arranged inside the fastening reception opening which is formed by the side wall of this component.

In this way, it is possible to replace the roller head fast and in a simple and self-explanatory way.

A second aspect of the invention relates to an arrangement comprising a welding arm for a resistance seam welding machine and a roller head fastened thereon. The roller head has a stator and an electrode roller which is supported as a rotor on the stator in a rotatable way about a rotation axis. The stator protrudes over the electrode roller with fastening extensions on both sides of the electrode roller in the direction of the rotation axis.

The welding arm has a reception opening for the roller head, which is formed between two, preferably parallel, limiting walls facing each other. These limiting walls have themselves fastening reception openings for the fastening extensions of the stator of the roller head.

The roller head is arranged inside the reception opening in such a way that the electrode roller protrudes outside the reception opening with a part of its circumferential boundary and the fastening extensions are arranged inside the fastening reception openings. It is fastened to the welding arm by pressing each of the fastening extensions of the stator with an even contact surface formed thereon to an attributed even contact surface inside the boundaries of the respective fastening reception opening.

Each of the fastening extensions of the stator is pressed with a clamping piece received in the respective fastening reception opening with its contact surfaces against the attributed contact surfaces.

It has been noticed mounting errors can be avoided due to the design according to the invention and a good and reliable sealing and current transmission can be reached.

In a first embodiment alternative the attributed contact surface is provided by an adapter arrangement arranged inside the respective fastening reception opening, which itself is pressed with a contact surface formed thereon on an attributed contact surface formed by the boundaries of the respective fastening reception opening. Such solutions are considered as upgrade solutions for existing welding arms according to the prior art.

In a second preferred embodiment alternative each attributed contact surface is provided by the boundaries of the respective fastening reception opening, and not like in the first embodiment alternative by an additional component arranged between these boundaries and the contact surface of the respective fastening extensions. In this way, a direct current transmission from the welding arm to the fastening extensions of the roller head is possible and the fastening reception openings can be designed smaller, thereby enabling a more stable design of the welding arm. It is also possible to fasten the roller head to the welding arm with very little and easy to manufacture parts, which promotes cost effective solutions and requires little know-how and time for replacing the roller heads.

Preferably, the contact surfaces at the fastening extensions of the stator and the attributed contact surfaces extend in planes, which are parallel to the rotation axis of the electrode roller, advantageously perpendicular to a longitudinal axis of the welding arm. In this way, large position-tolerant contact surfaces can be formed between the fastening extensions of the stator and the boundaries of the fastening reception openings on the welding arm, and the stator of the roller head has in mounted state a precisely defined rotational position with respect to the contact surfaces of the boundaries of the fastening reception openings.

Advantageously, the fastening reception openings on the welding arm are circumferentially closed. In this way, an unnecessary structural weakening of the welding arm is avoided.

Advantageously, the clamping pieces are guided through the boundaries of the fastening reception opening for an ability to shift in clamping direction.

Preferably, this is implemented in such a way that for guidance, the clamping pieces adjoin, for an ability to shift in clamping direction, attributed guiding surfaces of the boundaries of the fastening reception opening by means of even guiding surfaces extending in pressing direction.

It is also preferred that each clamping piece engages a fastening extension of the stator from the side opposed to the contact surface.

By the aforementioned measures, it is possible to press the fastening extensions of the stator reliably and in a controlled manner on the contact surfaces of the boundaries of the fastening reception openings of the welding arm.

It is preferred that the fastening extensions of the stator and the fastening reception openings are adapted in such a way on the welding arm that the fastening extensions can be pressed with their contact surfaces in different positions on the contact surfaces of the boundaries of the fastening reception openings, preferably in different positions transversely to the rotation axis of the electrode roller and perpendicularly to the longitudinal axis of the welding arm. In this way it is possible to shift the rotation axis of the electrode roller transversely to the longitudinal axis of the welding arm and to reach even in case of different electrode roller diameters and fixed welding arm that the electrode roller always protrudes with its circumferential boundary by a certain amount out of the reception opening and thus can be aligned on the so-called “Z-rail” or the welding plane, respectively.

Advantageously, the positions of the fastening extensions are set by means of the clamping pieces in such a way that during pressing of the fastening extensions the latter establish a positive fit with the boundaries of the respective fastening reception opening in a direction parallel to the plane of the contact surfaces and perpendicular to the rotation axis of the electrode roller as well as a positive fit with the respective fastening extension in this direction. In this way, the positions for certain electrode roller diameters with attributed clamping pieces can be set without complex adjustment effort in a positive fitting way and thus securely.

For embodiments of the arrangement in case of which each clamping piece engages a fastening extension of the stator from the side opposed to the contact surface, it is preferred that the rotation axis of the electrode roller has different distances to the planes in which the even guiding surfaces extending in pressing direction of the clamping pieces run.

If the clamping pieces are formed in such a way that they can be mounted in two different positions for the optional positioning of the contact surfaces of the fastening extensions of the stator in two different positions on the contact surfaces of the boundaries of the fastening reception openings, which is preferred, this makes it possible to attribute the clamping piece to two different electrode roller diameters and thereby to halve the number of the clamping piece dimensions, which is required for a certain number of different electrode roller diameters.

In a further preferred embodiment of the arrangement according to the invention, each one of the fastening extensions of the stator has a circular cross section with a flattening forming the contact surface, as seen in the direction of the rotation axis of the electrode roller. Such contours can be manufactured easily and cost effectively and make possible a precisely defined rotational orientation of the stator of the roller arrangement with respect to the welding arm.

Advantageously, the clamping pieces are pressed against the fastening extensions of the stator by means of clamping screws fastened in the welding arm for pressing the fastening extensions with the contact surfaces formed thereon on the attributed contact surfaces. In this way, all forces used for pressing remain inside the welding arm and large pressing forces can be provided in a simple and precise way.

In yet a further preferred embodiment of the arrangement, the contact surfaces of the fastening extensions of the stator and the attributed contact surfaces of the boundaries of the fastening reception openings have supply and discharge openings for a cooling medium. The fastening extensions of the stator can be arranged and fastened in the fastening reception openings for the fastening extensions in such a way that each of the supply and discharge openings overlap at least partially in each intended position.

It is preferred that seals for sealing the at least partially overlapping supply and discharge openings towards the exterior are arranged in the contact surfaces of the fastening reception openings. This design makes it possible to avoid a weakening of the fastening extensions of the roller head stator by cavities for receiving the seal.

In yet a further preferred embodiment of the arrangement according to the invention, one of the limiting walls facing each other of the reception opening for the roller head, which limiting walls form the fastening reception openings for the fastening extensions of the stator of the roller head, is formed by a component which can be temporarily removed from a main body of the welding arm, which main body forms the other one of the two limiting walls of the reception opening for the roller head. In this way, it is possible to replace the roller head fast and in a simple and self-explanatory way.

A third aspect of the invention relates to a resistance seam welding machine with an arrangement according to the second aspect of the invention.

A fourth aspect of the invention relates to a roller head for an arrangement according to the second aspect of the invention or for a resistance seam welding machine according to the third aspect of the invention, comprising a stator and an electrode roller, which is supported as a rotor on the stator in a rotatable way about a rotation axis, wherein the stator protrudes over the electrode roller with fastening extensions on both sides of the electrode roller in the direction of the rotation axis. The fastening extensions of the stator have even contact surfaces for fastening the roller head by pressing to attributed contact surfaces of a welding arm for a resistance seam welding machine. These contact surfaces extend in planes running parallel to the rotation axis of the electrode roller. By this design, it is reached that the stator of the roller head assumes during its mounting on the welding arm a defined rotational orientation with respect to the welding arm.

This is particularly advantageous when the contact surfaces of the fastening extensions of the stator have supply and discharge openings for a cooling medium for supplying and discharging a cooling medium to the electrode roller and from it, respectively. These supply and discharge openings have to be aligned with attributed supply and discharge openings on the welding arm during mounting, which can occur automatically in this embodiment of the roller head according to the invention when the welding arm is designed accordingly and thereby helps to avoid mounting errors.

In a preferred embodiment of the roller head, each one of the fastening extensions of the stator has a circular cross section with a flattening forming the contact surface, as seen in the direction of the rotation axis of the electrode roller.

A fifth aspect of the invention relates to the use of the arrangement according to the second aspect of the invention for resistance seam welding of the longitudinal seam of container bodies.

BRIEF DESCRIPTION OF THE DRAWINGS

In the following, the present prior art and the invention are explained in more detail with reference to the drawings. The drawings show in.

DESCRIPTION OF THE PREFERRED EMBODIMENTS

Figure 1:
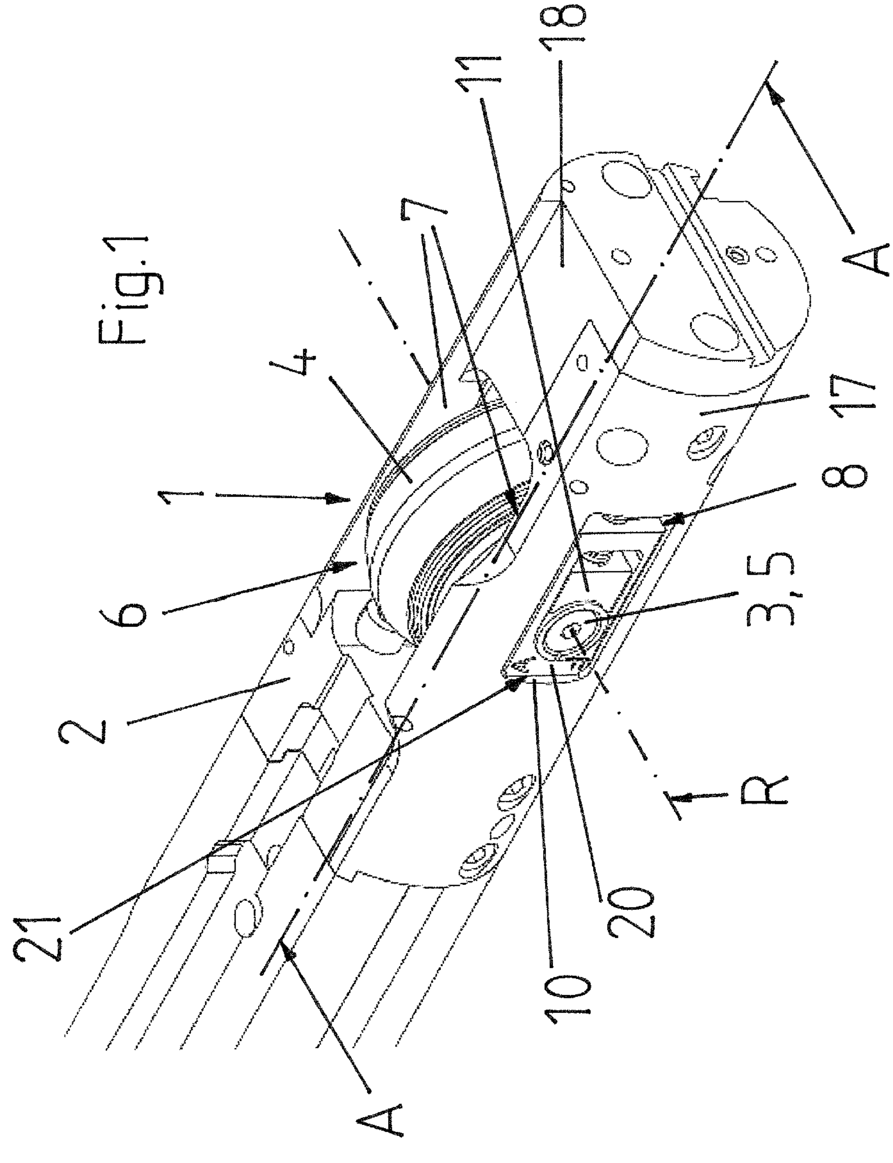
FIG. 1 is a perspective view of a welding arm for a resistance seam welding machine with a roller head attached thereto according to the prior art.

FIG. 1 shows a welding arm for a resistance seam welding machine with a roller head attached to it, as is known from the prior art, in a perspective view.

Roller heads for resistance seam welding machines are known to the skilled person, for example from the documents DE 40 20 182 C1 and WO 2013/181765 A1 mentioned at the beginning, and therefore need not be described in detail here.

Such roller heads 1 comprise a stator 3 and an electrode roller 4, which is mounted as a rotor on the stator 3 so as to be rotatable about a rotation axis R. The stator 3 is located on both sides of the electrode roller 4. The stator 3 protrudes on both sides of the electrode roller 4 in the direction of the rotation axis R with fastening extensions 5 over the electrode roller 4.

As can be seen, the welding arm 2 has a reception opening 6 for the roller head 1, which is formed between two opposing parallel limiting walls 7.

The limiting walls 7 each have circumferentially closed fastening reception openings 8 for the fastening extensions 5 of the stator 3 of the roller head 1.

The roller head 1 is arranged in the reception opening 6 of the welding arm 2 in such a way that the electrode roller 4 protrudes with a part of its circumferential limitation from the receiving opening 6 and the fastening extensions 5 are arranged in the fastening reception openings 8.

Figure 2:
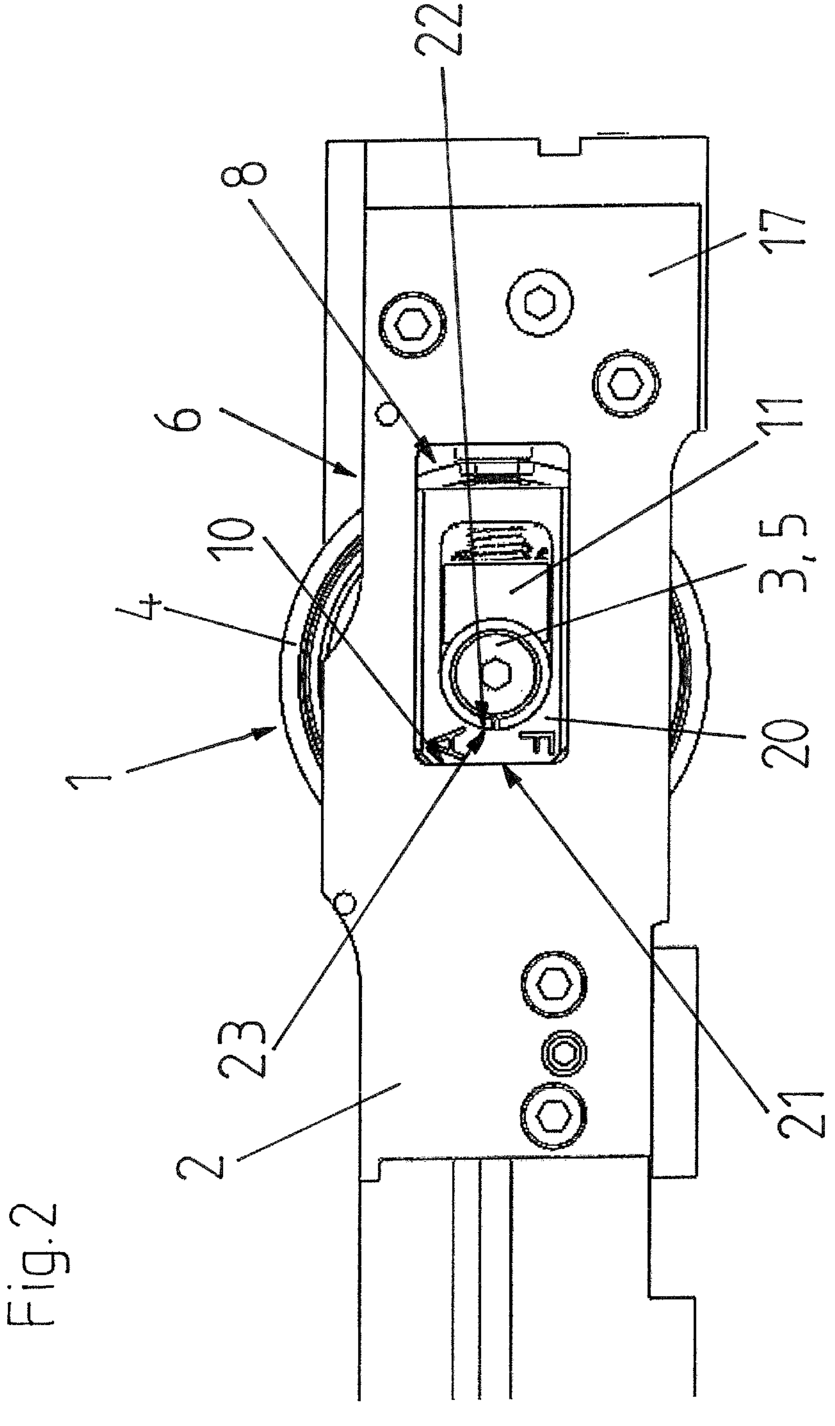
FIG. 2 is a side view of the welding arm of FIG. 1.
Figure 3:
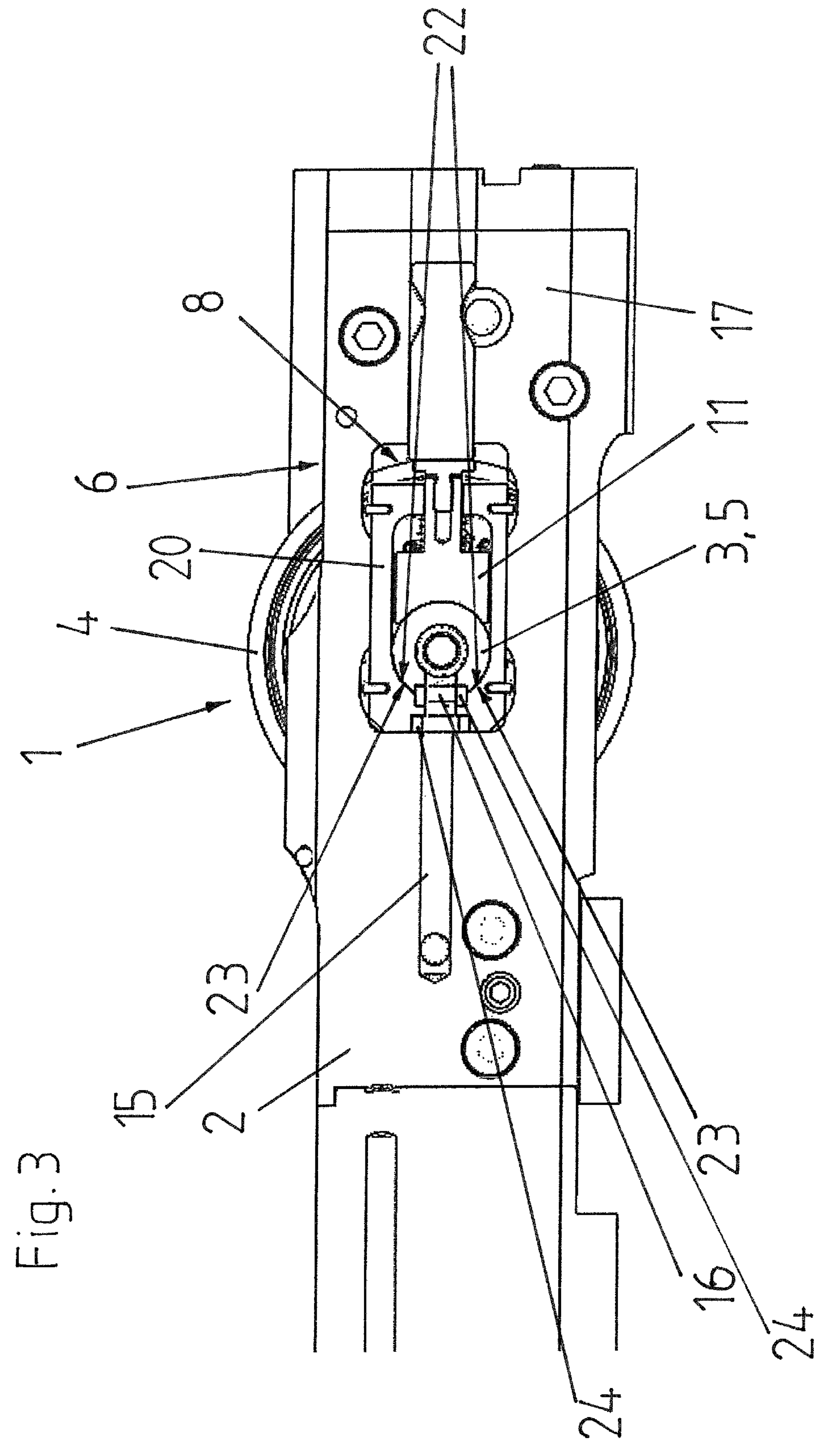
FIG. 3 is a vertical section through the welding arm of FIG. 1 along line A-A in FIG. 1.

As can be seen from a synopsis with FIGS. 2 and 3, which show a side view of the welding arm of FIG. 1 (FIG. 2) and a vertical section through the welding arm of FIG. 1 along the line A-A in FIG. 1 (FIG. 3), the fastening extensions 5 of the stator 3 are formed as cylindrical axle stubs with a circular cross-section, and the roller head 1 is fastened to the welding arm 2 by pressing these axle stubs 5 in each case with a curved contact surface 23 formed thereon against an attributed curved contact surface 22 within the boundaries of the respective fastening reception opening 8.

Each of the attributed curved contact surfaces 22 is provided by an adapter arrangement 20 arranged in the respective fastening reception opening 8, which in turn is pressed with a contact surface 21 formed thereon against an attributed contact surface 10 formed by the boundaries of the respective fastening reception opening 8.

The fastening extensions 5 of the stator 3 are each pressed with their contact surfaces 23 against the attributed contact surfaces 22 by means of a clamping piece 11 received in the respective fastening reception opening 8. The clamping pieces 11 surround the fastening extensions 5 of the stator 3 in each case from the side opposite the contact surface 23.

Figure 4:
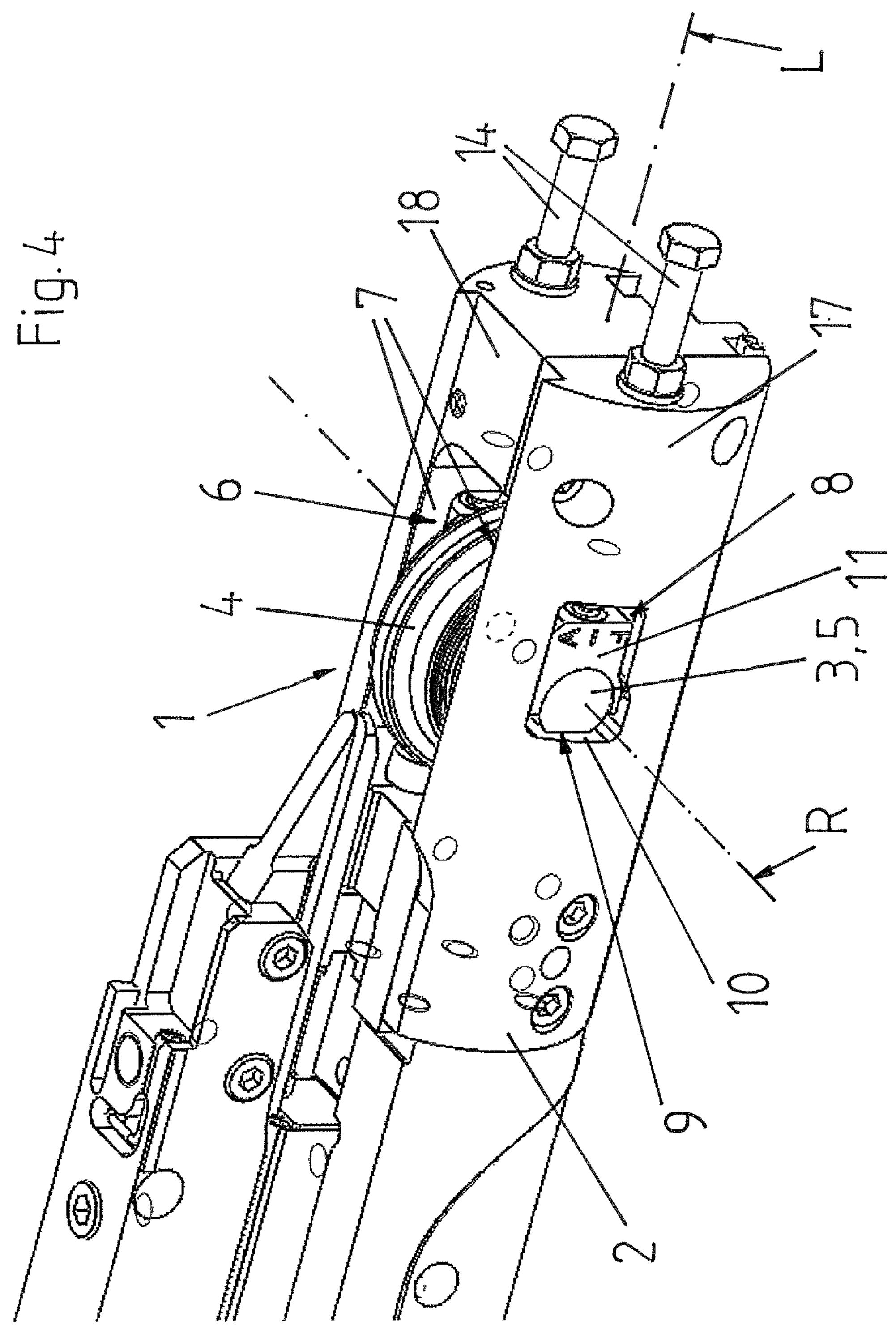
FIG. 4 is a perspective view of a first welding arm for a resistance seam welding machine with a roller head attached thereto according to the invention.

FIG. 4 shows a first arrangement according to the invention in the form of a first welding arm according to the invention for a resistance seam welding machine with a roller head according to the invention attached to it in a perspective view.

As can be seen, here too the welding arm 2 has a reception opening 6 for the roller head 1, which is formed between two opposing parallel limiting walls 7.

Here, the roller head 1 comprises a stator 3 and an electrode roller 4 as well, which is mounted as a rotor on the stator 3 so as to be rotatable about a rotation axis R. The stator 3 projects over the electrode roller 4 on both sides of the electrode roller 4 in the direction of the rotation axis R by means of fastening extensions 5.

The limiting walls 7 also have each closed fastening reception openings 8 for the fastening extensions 5 of the stator 3 of the roller head 1 and the roller head 1 is also arranged inside the reception opening 6 of the roller head 1 in such a way that the electrode roller 4 protrudes with a part of its circumferential extension out of the reception opening 6 and the fastening extensions 5 are arranged inside the fastening reception openings 8.

One of the two opposite limiting walls 7 of the receiving opening 6 for the roller head 1, which form one of the fastening reception openings 8 for the fastening extensions 5 of the stator 3 of the roller head 1, is formed by a component 17 which can be temporarily removed from a main body 18 of the welding arm 2, which forms the other of the two opposite limiting walls 7 of the reception opening 6 for the roller head 1, for the purpose of mounting or replacing the roller head 1.

Figure 5:
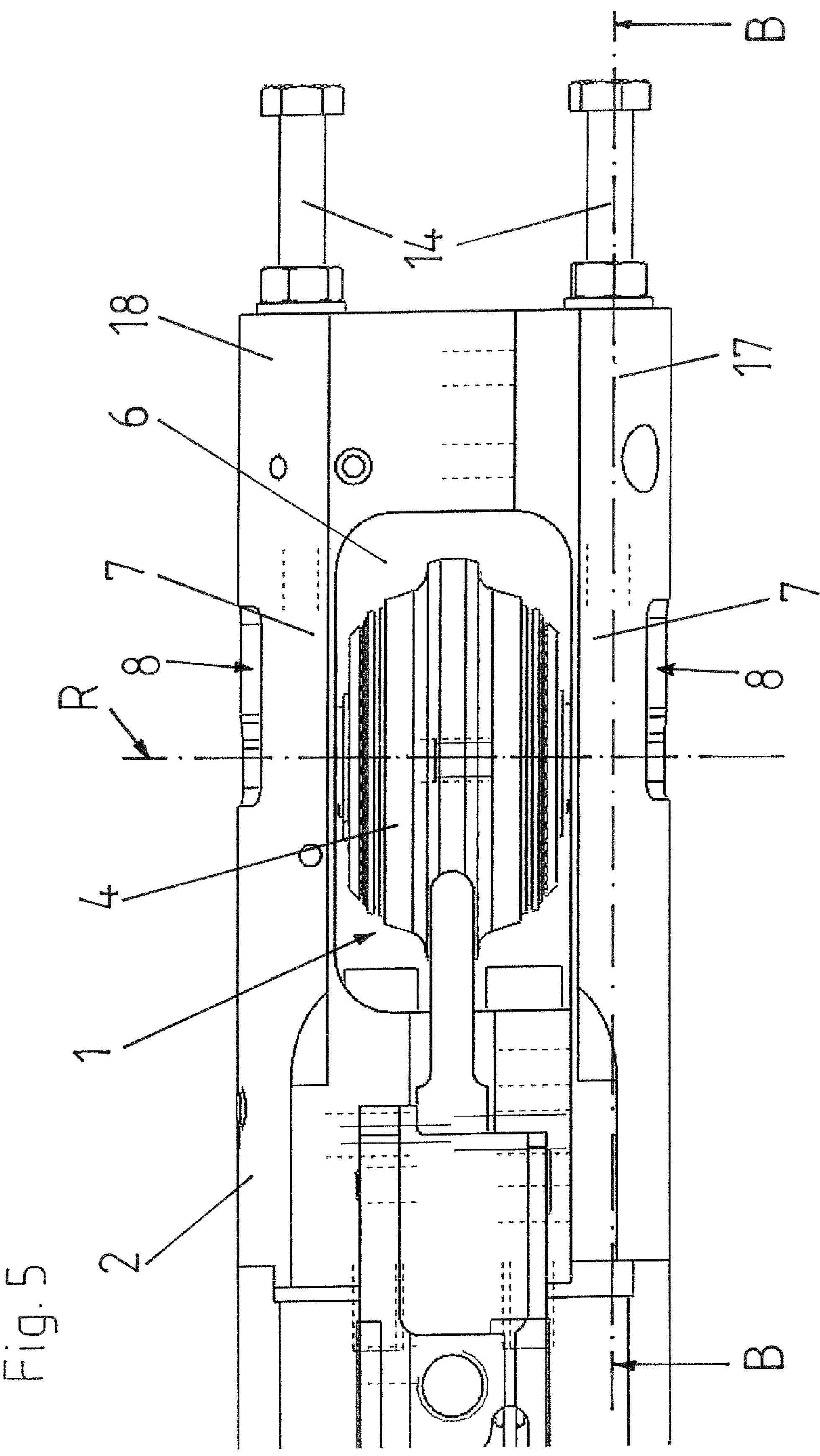
FIG. 5 is a top view of the welding arm of FIG. 4.
Figure 6:
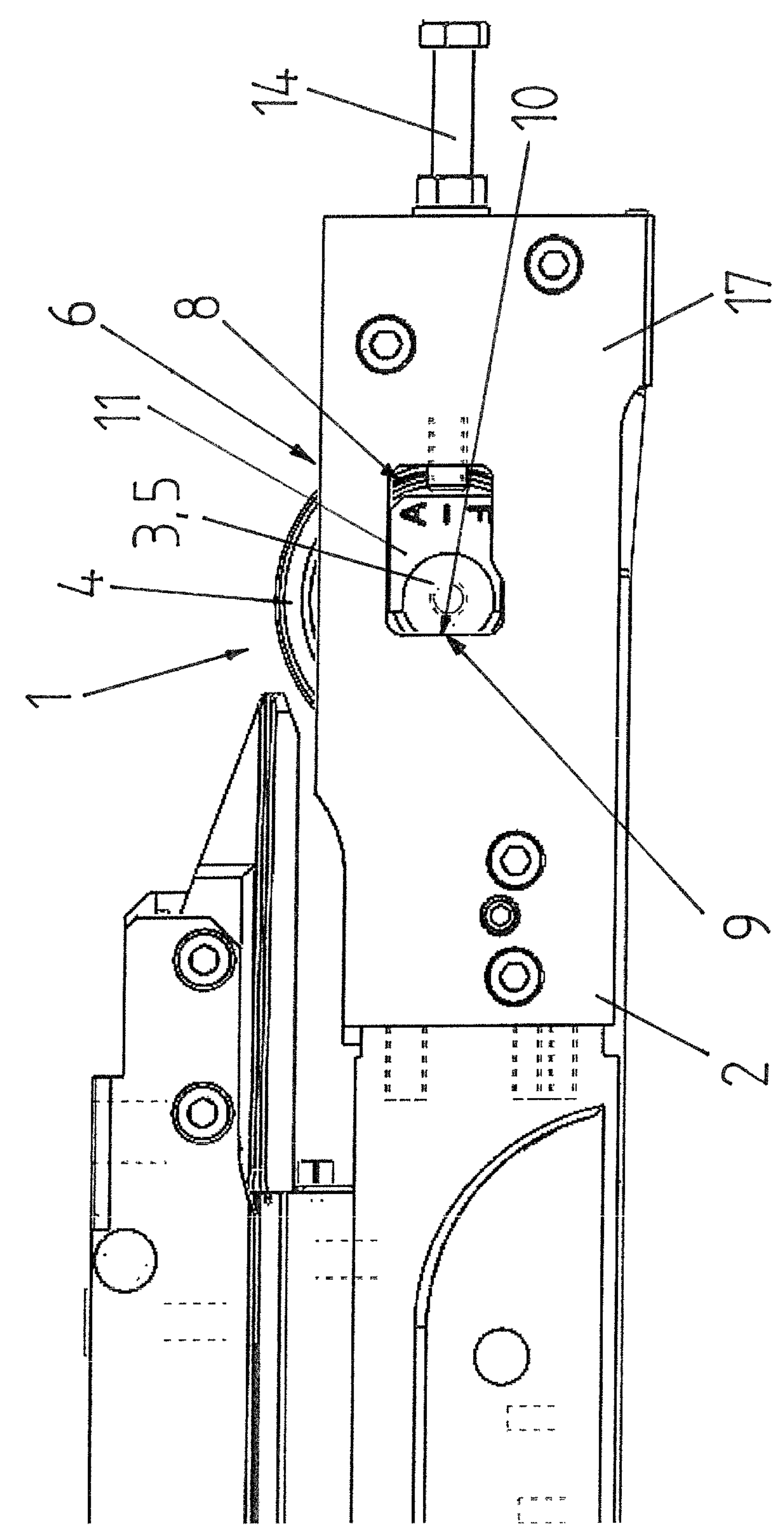
FIG. 6 is a side view of the welding arm of FIG. 4.
Figure 7:
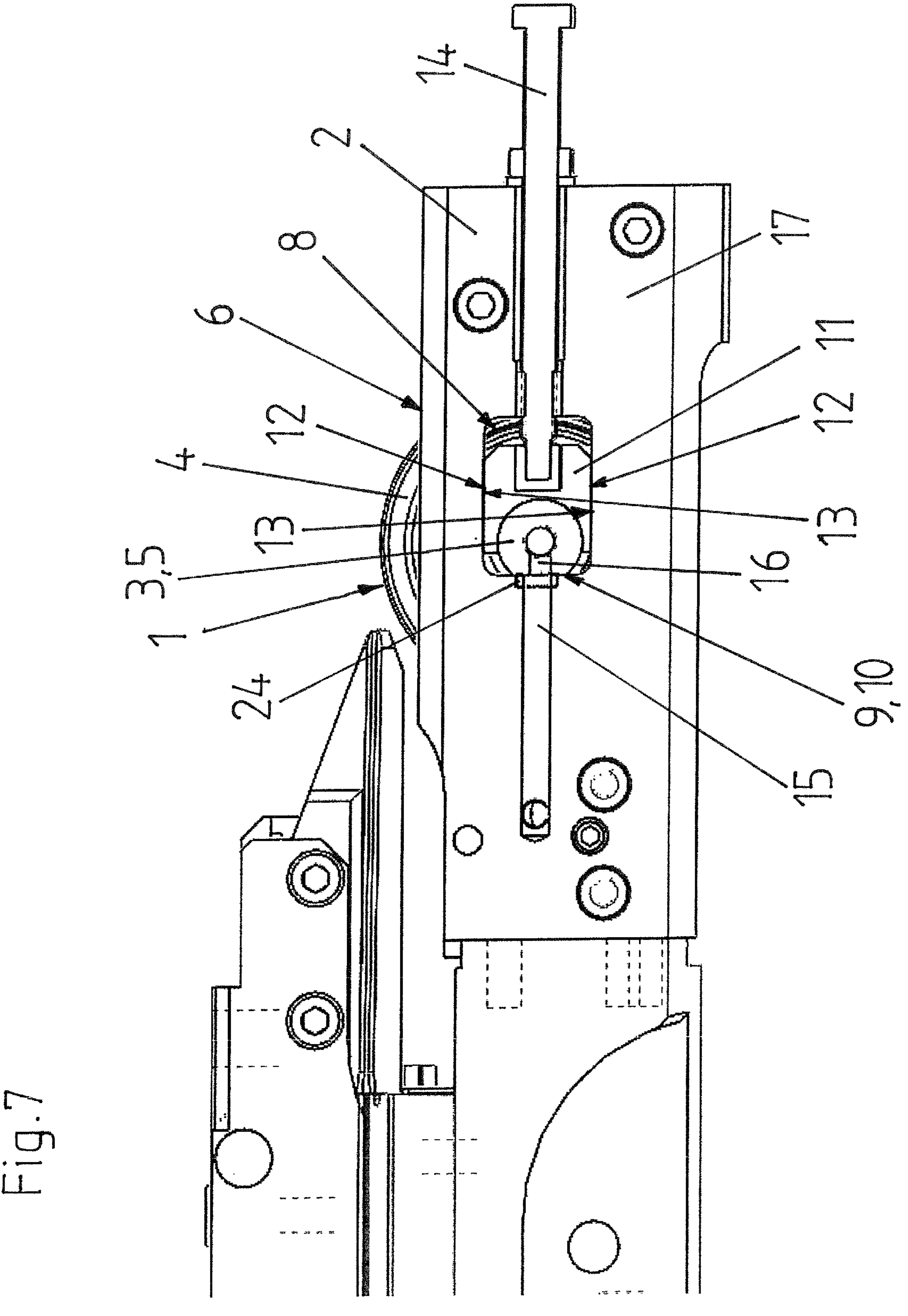
FIG. 7 is a section through the welding arm of FIG. 4 along the line B-B in FIG. 5.

As can be seen from a synopsis with FIGS. 5 to 7, which show a top view of the welding arm of FIG. 4 (FIG. 5), a side view of the welding arm of FIG. 4 (FIG. 6) and a section through the welding arm of FIG. 4 along the line B-B in FIG. 5 (FIG. 7), the fastening extensions 5 of the stator 3 in this embodiment according to the invention, viewed in the direction of the rotation axis R of the electrode roller 4, each have a circular cross-section with a flattening which forms the contact surface 9 of the respective fastening extension 5.

In this embodiment, the attributed contact surfaces 10 are formed by the boundaries of the respective fastening reception opening 8.

The contact surfaces 9 on the fastening extensions 5 of the stator 3 and the attributed contact surfaces 10 on the boundaries of the respective fastening reception opening 8 extend in planes which run parallel to the rotation axis R of the electrode roller 4 and perpendicular to the longitudinal axis L of the welding arm 2.

The contact surfaces 9 of the fastening extensions 5 of the stator 3 are also pressed against the attributed contact surfaces 10 by means of a clamping piece 11 received in the respective fastening reception opening 8. Here, the clamping pieces 11 embrace as well the fastening extensions 5 of the stator 3 in each case from the side opposite the contact surface 9.

However, here the clamping pieces 11 are guided for shiftability in the clamping direction through the boundaries of the fastening reception openings 8, in such a way that for the purpose of guidance for shiftability in the clamping direction they directly adjoin associated guiding surfaces 13 of the boundaries of the fastening reception openings 8 with flat guiding surfaces 12 running in the pressing direction.

The fastening extensions 5 of the stator 3 and the fastening reception openings 8 are designed in such a way here that the contact surfaces 9 of the fastening extensions 5 can be pressed against the contact surfaces 10 of the boundaries of the fastening reception openings 8 in various positions.

The positions are determined by the clamping pieces 11 in such a way that, when the fastening extensions 5 are pressed against them, they produce both a positive fit with the boundaries of the respective fastening reception opening 8 in a direction parallel to the plane of the contact surfaces 9 and 10 and also perpendicular to the rotation axis R of the electrode roller 4, and a positive fit with the respective fastening extension 5 in a direction parallel to the plane of the contact surfaces 9 and 10 and also perpendicular to the rotation axis R of the electrode roller 4.

As can be seen, the clamping pieces 11 are designed in such a way that the rotation axis R of the electrode roller 4 has different distances to the planes in which the flat guide surfaces 12 of the clamping pieces 11 run in the pressing direction.

The clamping pieces 11 are also designed in such a way that they can be installed in two different positions, for selective positioning of the contact surfaces 9 of the fastening extensions 5 of the stator 3 in two different positions on the contact surfaces 10 of the boundaries of the fastening reception openings 8.

The clamping pieces 11 are pressed against the fastening extensions 5 of the stator 3 by means of clamping screws 14 fastened in the welding arm 2, for pressing the contact surfaces 9 formed thereon against the attributed contact surfaces 10 of the boundaries of the fastening reception openings 8.

As can be seen from FIG. 7, which shows a vertical section along the line B-B in FIG. 5, the contact surfaces 9 of the fastening extensions 5 of the stator 3 and the attributed contact surfaces 10 of the boundaries of the fastening reception openings 8 have supply and discharge openings 15, 16 for a cooling medium for the roller head 1. In this case, the fastening extensions 5 of the stator 3 are arranged and fastened in the fastening reception openings 8 in such a way that the supply and discharge openings 15, 16 overlap in every possible position.

As can also be seen, seals 24 are arranged in the contact surfaces 10 of the fastening reception openings 8 for sealing the overlapping supply or discharge openings 15, 16 towards the outside.

Figure 8:
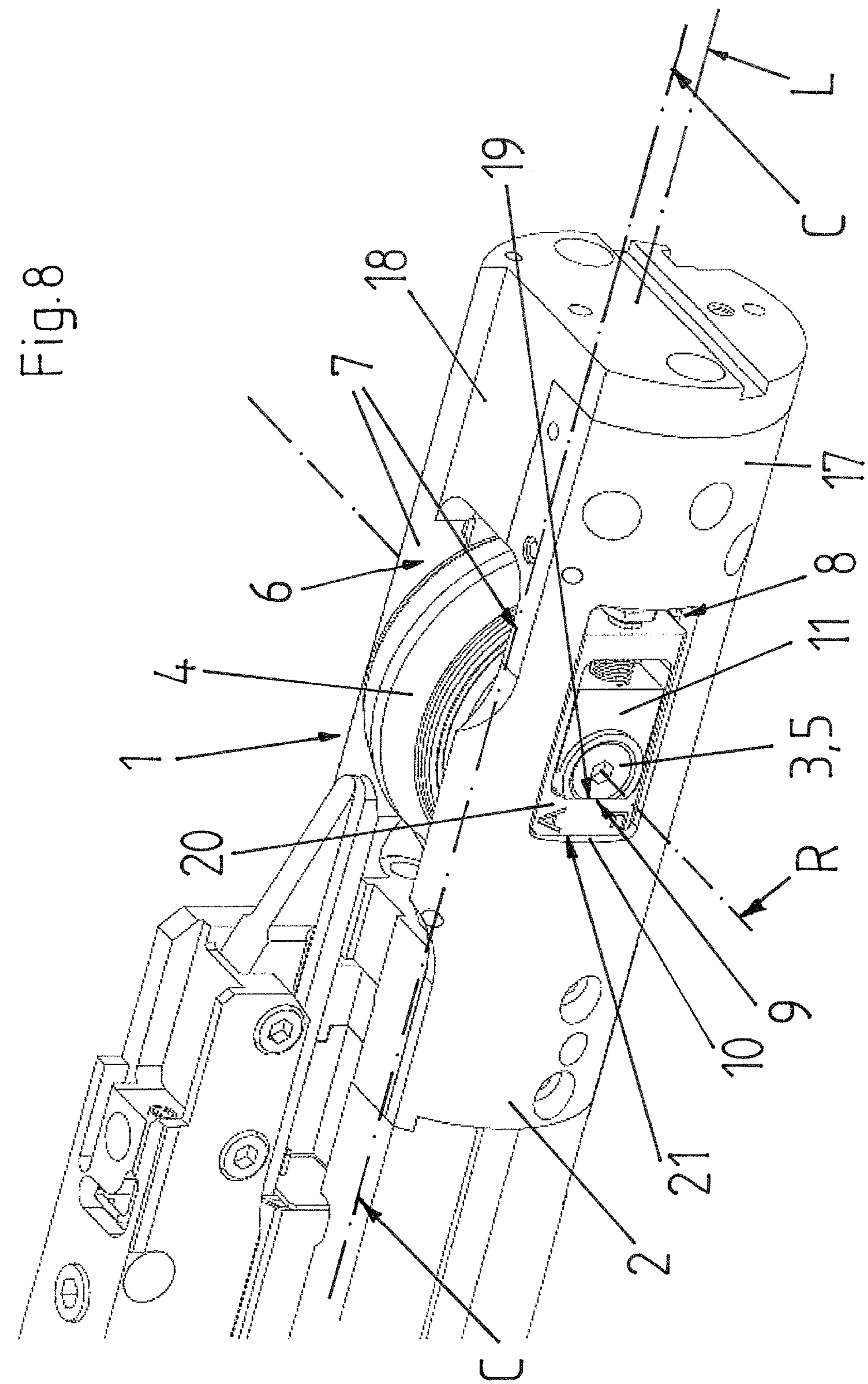
FIG. 8 is a perspective view of a second welding arm for a resistance seam welding machine with a roller head attached thereto according to the invention.

FIG. 8 shows a second arrangement according to the invention in the form of a welding arm for a resistance seam welding machine with a roller head according to the invention attached thereto in a perspective view. This embodiment of the invention represents a retrofit solution for existing welding arms according to the prior art.

The basic concept of this arrangement is the same as that of the prior art arrangement described in FIGS. 1 to 3.

Figure 9:
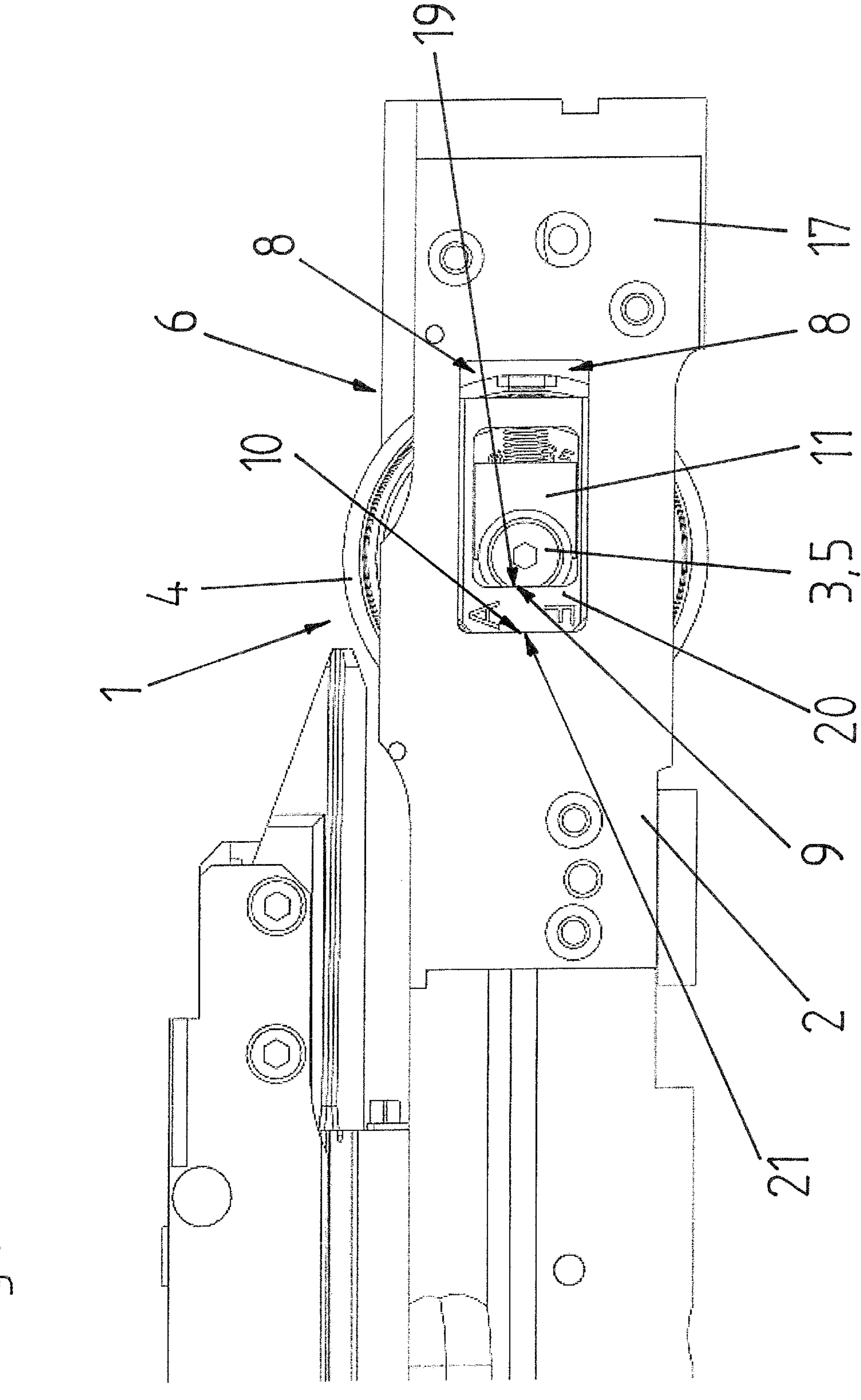
FIG. 9 is a side view of the welding arm of FIG. 8.
Figure 10:
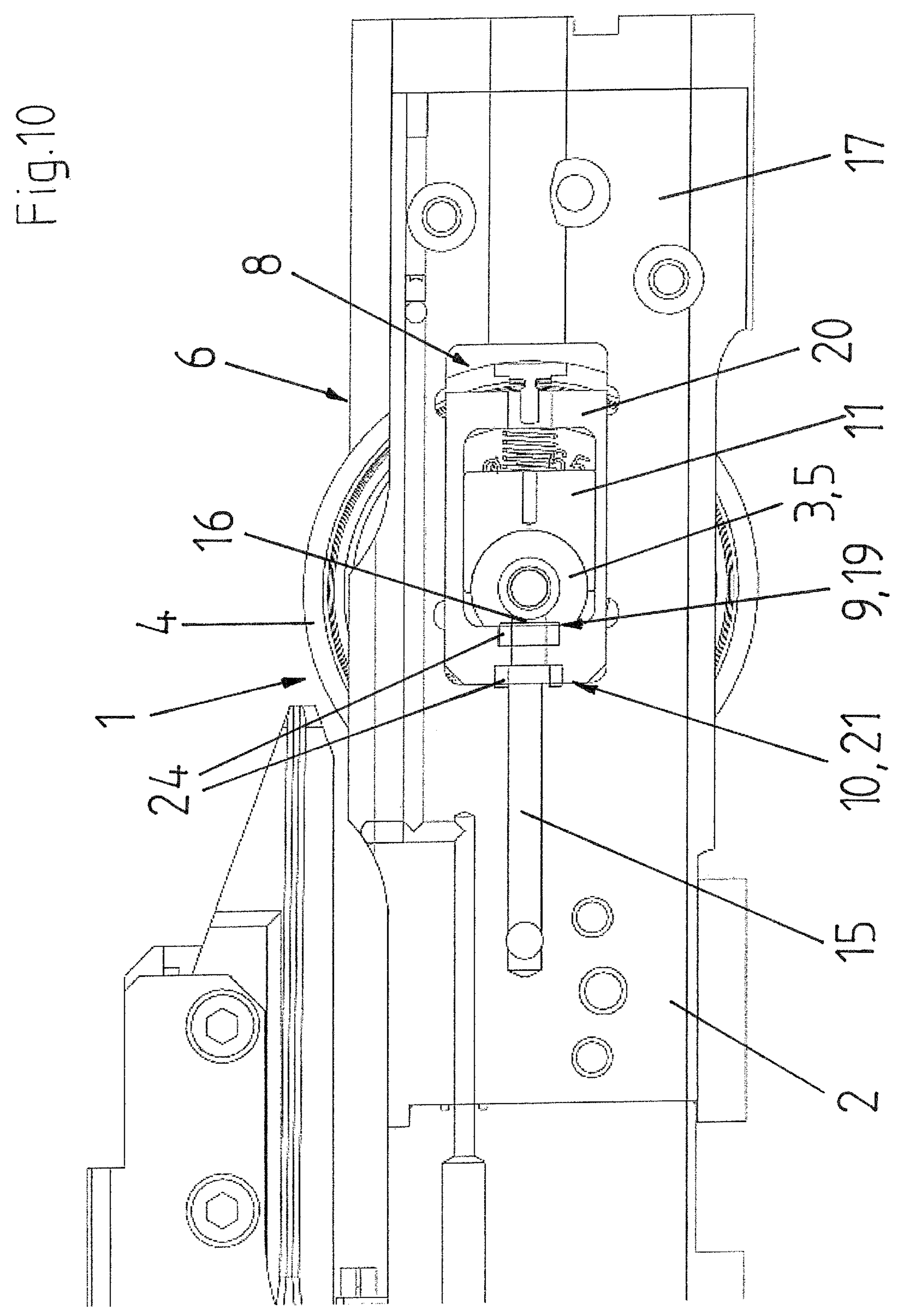
FIG. 10 is a section through the welding arm of FIG. 8 along the line C-C in FIG. 8.

As can be seen from a combination of FIG. 8 with FIGS. 9 and 10, which show a side view of the welding arm of FIG. 8 (FIG. 9) and a cross-section through the welding arm of FIG. 8 along the line C-C in FIG. 8 (FIG. 10), the fastening extensions 5 of the stator 3 in this second embodiment according to the invention, viewed in the direction of the rotation axis R of the electrode roller 4, each have a circular cross-section with an even flattening which forms the contact surface 9 of the respective fastening extension 5.

In this embodiment, the associated even contact surfaces 19 are each provided by an adapter arrangement 20 arranged in the respective fastening reception opening 8, which in turn is pressed with a contact surface 21 formed thereon against an attributed contact surface 10 formed by the boundaries of the respective fastening reception opening 8.

The fastening extensions 5 of the stator 3 are also pressed here in each case with a clamping piece 11 received in the respective fastening reception opening 8 with their contact surfaces 9 against the attributed contact surfaces 19. The clamping pieces 11 embrace the fastening extensions 5 of the stator 3 in each case from the side opposite the contact surface 9.

The contact surfaces 9 on the fastening extensions 5 of the stator 3 and the corresponding contact surfaces 19 on the adapter arrangements 20 run in planes which are parallel to the rotation axis R of the electrode roller 4 and perpendicular to the longitudinal axis L of the welding arm 2.

The fastening extensions 5 of the stator 3 and the adapter arrangements 20 are designed in such a way that the fastening extensions 5 can be pressed with their contact surfaces 9 in different positions against the contact surfaces 19 of the adapter arrangements 20.

The positions are determined by the clamping pieces 11, which, when the fastening extensions 5 are pressed against them, produce both a form fit with the adapter arrangements 20 in a direction parallel to the plane of the contact surfaces 9 and 19 and also perpendicular to the rotation axis R of the electrode roller 4, and a form fit with the respective fastening extension 5 in a direction parallel to the plane of the contact surfaces 9 and 19 and also perpendicular to the rotation axis R of the electrode roller 4.

As can be seen from FIG. 10, which shows a vertical section along the line C-C in FIG. 8, the contact surfaces 9 of the fastening extensions 5 of the stator 3 and the associated contact surfaces 19 of the adapter arrangements 20, as well as the contact surfaces 21 of the adapter arrangements 20 and the attributed contact surfaces 10 of the boundaries of the fastening reception openings 8, have supply and discharge openings 15, 16 for a cooling medium for the roller head 1. The fastening extensions 5 of the stator 3 and the adapter arrangements 20 are arranged and fastened in the fastening reception openings 8 in such a way that the supply and discharge openings 15, 16 overlap.

As can also be seen, seals 24 are arranged in the contact surfaces 19 of the adapter arrangement 20 and in the contact surfaces 10 of the fastening reception openings 8, for sealing the overlapping supply and discharge openings 15, 16 towards the outside.

While preferred embodiments of the invention are described in the present application, it should be clearly noted that the invention is not limited to these and may also be carried out in other ways within the scope of the claims that now follow.

What is claimed is:

1. A method for fastening a roller head to a welding arm for a resistance seam welding machine, wherein the roller head has a stator and an electrode roller which is supported as a rotor on the stator in a rotatable way about a rotation axis, and wherein the stator protrudes over the electrode roller with fastening extensions on both sides of the electrode roller in the direction of the rotation axis, comprising the steps:

a) providing a welding arm for a resistance seam welding machine comprising a reception opening for the roller head, which is formed between two, particularly parallel, limiting walls facing each other, which themselves have fastening reception openings for the fastening extensions of the stator of the roller head;

b) arranging the roller head in the reception opening for the roller head in such a way that the electrode roller protrudes outside the reception opening with a part of its circumferential boundary and the fastening extensions are arranged inside the fastening reception openings;

c) fastening the roller head to the welding arm by pressing each of the fastening extensions of the stator with an even contact surface formed thereon to an attributed even contact surface inside the boundaries of the respective fastening reception opening, wherein each of the fastening extensions of the stator is pressed with a clamping piece received in the respective fastening reception opening with its contact surfaces against the attributed contact surfaces.

2. The method according to claim 1, wherein the attributed contact surface is provided by an adapter arrangement arranged inside the respective fastening reception opening, which itself is pressed with a contact surface formed thereon on an attributed contact surface formed by the boundaries of the respective fastening reception opening.

3. The method according to claim 1, wherein each attributed contact surface is provided by the boundaries of the respective fastening reception opening.

4. The method according to claim 3, wherein the contact surfaces at the fastening extensions of the stator and the attributed contact surfaces extend in planes, which are parallel to the rotation axis of the electrode roller, and particularly perpendicular to a longitudinal axis of the welding arm.

5. The method according to claim 3, wherein the clamping pieces are guided through the boundaries of the fastening reception openings for an ability to shift in clamping direction.

6. The method according to claim 5, wherein, for guidance, the clamping pieces adjoin, for an ability to shift in clamping direction, attributed guiding surfaces of the boundaries of the fastening reception openings by means of even guiding surfaces extending in pressing direction.

7. The method according to claim 3, wherein the fastening extensions of the stator and the fastening reception opening are adapted in such a way that the fastening extensions can be pressed with their contact surfaces in different positions on the contact surfaces of the boundaries of the fastening reception openings.

8. The method according to claim 7, wherein the positions are set by means of the clamping pieces in such a way that during pressing of the fastening extensions the latter establish a positive fit with the boundaries of the respective fastening reception openings in a direction parallel to the plane of the contact surfaces and perpendicular to the rotation axis of the electrode roller as well as a positive fit with the respective fastening extension in a direction parallel to the planes of the contact surfaces and perpendicular to the rotation axis of the electrode roller.

9. The method according to claim 3, wherein the clamping pieces are pressed against the fastening extensions of the stator by means of clamping screws fastened in the welding arm for pressing the fastening extensions with the contact surfaces formed thereon on the attributed contact surfaces.

10. The method according to claim 3, wherein the contact surfaces of the fastening extensions of the stator and the attributed contact surfaces of the boundaries of the fastening reception openings have supply and discharge openings for a cooling medium and the fastening extensions of the stator are arranged and fastened in the fastening reception openings for the fastening extensions in such a way that each of the supply and discharge openings overlap at least partially.

11. The method according to claim 1, wherein one of the limiting walls facing each other of the reception opening for the roller head, which limiting walls form the fastening reception openings for the fastening extensions of the stator of the roller head, is formed by a component which can be temporarily removed from a main body of the welding arm, which forms the other one of the two limiting walls of the reception opening for the roller head, particularly showing away in the direction of the rotation axis of the electrode roller, and wherein this component is removed temporarily for arranging the roller head in the reception opening and is reinstalled after inserting the roller head into the main body in such a way that one of the fastening extensions of the stator of the roller head is arranged inside the fastening reception opening which is formed by the side wall of the main body, in such a way that the other fastening extension of the stator is arranged inside the fastening reception opening which is formed by the side wall of the main body.

12. An arrangement comprising a welding arm for a resistance seam welding machine and a roller head fastened thereon, wherein the roller head has a stator and an electrode roller which is supported as a rotor on the stator in a rotatable way about a rotation axis, and wherein the stator protrudes over the electrode roller with fastening extensions on both sides of the electrode roller in the direction of the rotation axis, wherein the welding arm has a reception opening for the roller head, which is formed between two, particularly parallel, limiting walls facing each other, which themselves have fastening reception openings for the fastening extensions of the stator of the roller head, wherein the roller head is arranged inside the reception opening in such a way that the electrode roller protrudes outside the reception opening with a part of its circumferential boundary and the fastening extensions are arranged inside the fastening reception openings, wherein the roller head is fastened to the welding arm by pressing each of the fastening extensions of the stator with an even contact surface formed thereon to an attributed even contact surface inside the boundaries of the respective fastening reception opening, and wherein each of the fastening extensions of the stator is pressed with a clamping piece received in the respective fastening reception opening with its contact surfaces against the attributed contact surfaces.

13. The arrangement according to claim 12, wherein the attributed contact surface is provided by an adapter arrangement arranged inside the respective fastening reception opening, which itself is pressed with a contact surface formed thereon on an attributed contact surface formed by the boundaries of the respective fastening reception opening.

14. The arrangement according to claim 12, wherein each attributed contact surface is provided by the boundaries of the respective fastening reception opening.

15. The arrangement according to claim 14, wherein the contact surfaces at the fastening extensions of the stator and the attributed contact surfaces extend in planes, which are parallel to the rotation axis of the electrode roller, and particularly perpendicular to a longitudinal axis of the welding arm.

16. The arrangement according to claim 14, wherein the fastening reception openings are circumferentially closed.

17. The arrangement according to claim 16, wherein the clamping pieces are guided through the boundaries of the fastening reception opening for an ability to shift in clamping direction.

18. The arrangement according to claim 17, wherein, for guidance, the clamping pieces adjoin, for an ability to shift in clamping direction, attributed guiding surfaces of the boundaries of the fastening reception opening by means of even guiding surfaces extending in pressing direction.

19. The arrangement according to claim 14, wherein each clamping piece engages a fastening extension of the stator from the side opposed to the contact surface.

20. The arrangement according to claim 14, wherein the fastening extensions of the stator and the fastening reception opening are adapted in such a way that the fastening extensions can be pressed with their contact surfaces in different positions on the contact surfaces of the boundaries of the fastening reception opening.

21. The arrangement according to claim 20, wherein the positions are set by means of the clamping pieces in such a way that during pressing of the fastening extensions the latter establish a positive fit with the boundaries of the respective fastening reception opening in a direction parallel to the plane of the contact surfaces and perpendicular to the rotation axis of the electrode roller as well as a positive fit with the respective fastening extension in a direction parallel to the planes of the contact surfaces and perpendicular to the rotation axis of the electrode roller.

22. The arrangement according to claim 21, wherein each clamping piece engages a fastening extension of the stator from the side opposed to the contact surface and, wherein the rotation axis of the electrode roller has different distances to the planes in which the even guiding surfaces extending in pressing direction of the clamping pieces run.

23. The arrangement according to claim 22, wherein the clamping pieces are formed in such a way that they can be mounted in two different positions for the optional positioning of the contact surfaces of the fastening extensions of the stator in two different positions on the contact surfaces of the boundaries of the fastening reception openings.

24. The arrangement according to claim 14, wherein each one of the fastening extensions of the stator has a circular cross section with a flattening forming the contact surface, as seen in the direction of the rotation axis of the electrode roller.

25. The arrangement according to claim 14, wherein the clamping pieces are pressed against the fastening extensions of the stator by means of clamping screws fastened in the welding arm for pressing the contact surfaces formed thereon on the attributed contact surfaces of the boundaries of the fastening reception openings.

26. The arrangement according to claim 14, wherein the contact surfaces of the fastening extensions of the stator and the attributed contact surfaces of the boundaries of the fastening reception openings have supply and discharge openings for a cooling medium and the fastening extensions of the stator are arranged and fastened in the fastening reception openings in such a way that each of the supply and discharge openings overlap at least partially.

27. The arrangement according to claim 26, wherein seals for sealing the at least partially overlapping supply and discharge openings towards the exterior are arranged in the contact surfaces of the fastening reception openings.

28. The arrangement according to claim 14, wherein one of the two limiting walls facing each other of the reception opening for the roller head, which limiting walls form the fastening reception openings for the fastening extensions of the stator of the roller head, is formed, for the purpose of mounting or removing the roller head, by a component which can be temporarily removed from a main body of the welding arm, which forms the other one of the two limiting walls of the reception opening for the roller head.

29. A resistance seam welding machine with the arrangement according to claim 12.

30. A method of welding using the arrangement according to claim 12 for resistance seam welding of the longitudinal seam of container bodies.

* * * * *